UNITED STATES PATENT OFFICE.

WILLIAM E. HOKE, OF WASHINGTON, DISTRICT OF COLUMBIA.

WEAR-RESISTING SURFACE.

1,379,984.  Specification of Letters Patent.  Patented May 31, 1921.

No Drawing.   Application filed June 4, 1919.  Serial No. 301,760.

*To all whom it may concern:*

Be it known that I, WILLIAM E. HOKE, a citizen of the United States, residing at Washington, District of Columbia, have invented certain new and useful Improvements in Wear-Resisting Surfaces, of which the following is a specification.

My invention relates to wear-resisting surfaces, and is applicable to any location in which relatively movable parts are used, such as pistons, cylinders, gears, bearings, journals, etc.

It is well known that when the supply of lubricant between two wearing surfaces, such as a shaft and its bearing is not sufficiently maintained, the two surfaces will seize or adhere.

In the use of built-up gages it is the practice to wring surfaces together in order that, for measuring purposes, the surfaces may be brought as close together as possible. For wringing such surfaces together, it is indispensable that there should be between the surfaces an exceedingly thin film of liquid, as it has been found that two perfectly dry smooth surfaces will not adhere in the absence of such film. It is probable that "seizing" and "wringing" are closely related, if not identical phenomena; and that the seizing of two bearing surfaces is due to the fact that the layer of lubricating liquid is gradually diminished to the point at which this seizing or wringing action takes place. The exact physical reason why this action occurs is not thoroughly understood.

My invention, however, is based on the above mentioned observed facts, and I have found that perfectly dry polished surfaces of metal, such as steel, cast iron, brass, copper, bronze, etc., can be moved by rotation, reciprocation or otherwise over each other under ordinary working conditions, as in a bearing without abrasion and with less wear and less friction than when there is interposed between such surfaces a layer of the materials commonly known as lubricants, provided that the surfaces be sufficiently smooth to provide areas of contact adequate to bear the required pressure.

I have further found, if metals such as are above mentioned are properly "charged" with materials which are ordinarily regarded as abrasives, such as emery, rouge, aloxite, carborundum, alundum, etc., until such abrasives become glazed, (by which I mean that the surfaces in contact with each other are practically made up of the glazed particles, that bearings or other wearing surfaces will be produced which will operate with a minimum of wear and of friction provided that the wearing surfaces be kept entirely free from any liquid, such as oil, grease, or water.

The charging of the metals with the various materials mentioned can be effected by introducing between two surfaces of the same hardness finely pulverized material of the kind above mentioned, mixed with some volatile liquid such as benzol, alcohol, ether, chloroform, or even water, and then causing the surfaces to move on each other under suitable pressure until the liquid is evaporated. So long as the liquid is present the operation is that known as "lapping." As soon as the liquid has dissappeared, the pulverulent material balls or flakes and the continued movement of the surfaces on each other causes the material to be "charged" into the surfaces, and by charging I mean the embedding of the particles into the body of the metal at its surface portion. The continued movement of the surfaces causes these embedded particles to have their sharp edges broken down to form glazed or polished surfaces, this final action being not a grinding or lapping operation but a polishing or burnishing operation. The thus polished surfaces will move over each other under working conditions of load and relative movement with a minimum of wear and friction without any lubrication whatever.

Metal surfaces may also be charged with particles of pulverulent material by applying to the surface a mixture of oil and pulverulent material and causing the pulverulent material to be charged into the metal by pressure from a surface as hard or harder than the pulverulent material. Thus, a steel surface may be satisfactorily charged for my purpose by applying a mixture of oil and emery, rouge, etc., thereto and bringing the surface into contact with a whetstone of carborundum, emery, aloxite, etc. After the surface has thus been charged, all excess of charging material and oil must be carefully removed.

The thus charged surfaces when freed from oil and any free pulverulent material are, as above stated, suitable for use one upon the other as wear-resisting and friction diminishing surfaces; and surfaces made according to the last method may be used either dry or with clean oil as a lubricant, since the polished particles of abrasive material are firmly embedded in the metal and there is no free material which can combine with the oil to act as an abrasive.

On the other hand, when the surfaces are charged with abradants or abrasives by the dry method above specified, such surfaces should not be used with any lubricant since upon the addition of oil or the like, such particles as may not have been thoroughly embedded and are held upon the surface in a flaked or matted condition may be liberated, and if so, will then act as grinding or lapping agents.

It is well known that the grinding or abrading action of such materials as emery, etc., is due to the fact that the particles have sharp points or edges which serve to remove the surface of the metal with which they are brought into contact; but as soon as these sharp edges or points are worn off, these abradants cease to cut and become more or less smooth and act as polishing agents. By my methods, this latter feature is availed of to produce smooth frictionless wear-resisting bearing surfaces, and tough abrasives such as polish before breaking should preferably be used.

In the ordinary methods of lubricating as e. g. in oil-lubricated bearings, the two metal surfaces do not come into actual contact with each other but the pressure is supported upon a film of oil which must be maintained in order that the inequalities in the two surfaces may not come into contact with each other; while by my method the surfaces are sufficiently perfect so that in operation they are at least in partial contact, the pressure being distributed over sufficient areas of contact to prevent undue friction or wear.

Where two unequally hard surfaces with an abrasive, either dry or wet, between them, are moved upon each other, the abrasive will charge into the softer metal and lap the harder metal. If this operation is performed dry, as with a lead lap working on cast iron, then the particles of abrasive on the lead will gradually become coated with a layer of cast iron, while the surface of the cast iron will simply become lapped or polished.

If, however, two surfaces of equal hardness have interposed between them a thin film of abrasive (such as is produced by introducing the abrasive mixed with a volatile liquid) and the two surfaces are then ground together, the abrasive will be embedded in both surfaces which will then mutually polish each other until polished surfaces of embedded material are produced.

If, however, two equally hard surfaces have abrasives mixed with liquid between them and are ground together, then, owing to the presence of the liquid the two surfaces will mutually grind or lap each other with the actual removal of metal from the surfaces of each, the surfaces thus produced consisting of a multitude of fine scratches.

By my method when properly carried out, perfect glazed surfaces whether plain or curved are provided whereby the results above described are produced.

I claim:

1. A pair of mechanically coöperating parts, such as a shaft and bearing, having smooth engaging parts, the parts in engagement having embedded in their surface portions particles of material harder than the body of the part.

2. A device as claimed in claim 1 in which the embedded particles are composed of burnished particles of hard materials such as emery.

In testimony whereof I affix my signature.

WILLIAM E. HOKE.